US007843817B2

(12) United States Patent
Gong et al.

(10) Patent No.: US 7,843,817 B2
(45) Date of Patent: Nov. 30, 2010

(54) CONGESTION CONTROL IN WIRELESS MESH NETWORKS

(75) Inventors: Xiaohong Gong, Milpitas, CA (US); Robert B. O'Hara, Jr., Santa Clara, CA (US); Brian Donald Hart, Sunnyvale, CA (US); Johannes Petrus Kruys, Harmelen (NL)

(73) Assignee: Cisco Technology, Inc., San Jose, CA (US)

( * ) Notice: Subject to any disclaimer, the term of this patent is extended or adjusted under 35 U.S.C. 154(b) by 263 days.

(21) Appl. No.: 12/045,862

(22) Filed: Mar. 11, 2008

(65) Prior Publication Data

US 2009/0232001 A1    Sep. 17, 2009

(51) Int. Cl.
*H04J 1/16* (2006.01)
(52) U.S. Cl. ..................................... 370/229
(58) Field of Classification Search ................. 370/229, 370/230, 230.1, 236, 236.1, 232–235, 235.1
See application file for complete search history.

(56) References Cited

U.S. PATENT DOCUMENTS

| | | | | |
|---|---|---|---|---|
| 6,714,517 | B1 * | 3/2004 | Fawaz et al. | 370/236 |
| 6,757,263 | B1 * | 6/2004 | Olds | 370/315 |
| 2001/0036157 | A1 * | 11/2001 | Blanc et al. | 370/235 |
| 2002/0136163 | A1 * | 9/2002 | Kawakami et al. | 370/229 |
| 2004/0071086 | A1 * | 4/2004 | Haumont et al. | 370/230 |
| 2004/0165530 | A1 * | 8/2004 | Bedekar et al. | 370/235 |
| 2005/0180320 | A1 * | 8/2005 | Yeh | 370/229 |
| 2006/0092845 | A1 * | 5/2006 | Kwan et al. | 370/235 |

OTHER PUBLICATIONS

Gambiroza, Violeta, et al., "End to End Performance and Fairneses in Multihop Wireless Backhaul Networks", Department of Electrical and Computer Engineering, Rice University, Houston, TX, MobiCom '04, Sep. 26-Oct. 1, 2004.
Camp, J. et al., "Measurement Driven Depoyment of a Two-Tier Urban Mesh Access Network", Rice Networks Group, MobiSys 2006, Jun. 20, 2006.
Chimento, P.F., "Standard Token Bucket Terminology", May 18, 2000.
Green, Scott, "New Metromesh OS Release 5.1 from Tropos Delivers Next-Generation Metro-Scale Wi-Fi Capacity and Reliability" CLS Communications, Inc., Tropos Networks, Mar. 9, 2006.

* cited by examiner

*Primary Examiner*—Kwang B Yao
*Assistant Examiner*—Juvena Loo
(74) *Attorney, Agent, or Firm*—Baker Botts L.L.P.

(57) ABSTRACT

A congestion control system. In particular implementations, a method includes receiving packets into one or more queues and monitoring the one or more queues for congestion. The method also includes, if a number of packets in the one or more queues exceeds a first threshold, determining a congestion control mode. The method also includes generating a congestion control message indicating the congestion control mode and transmitting the congestion control message to one or more neighboring mesh nodes.

15 Claims, 7 Drawing Sheets

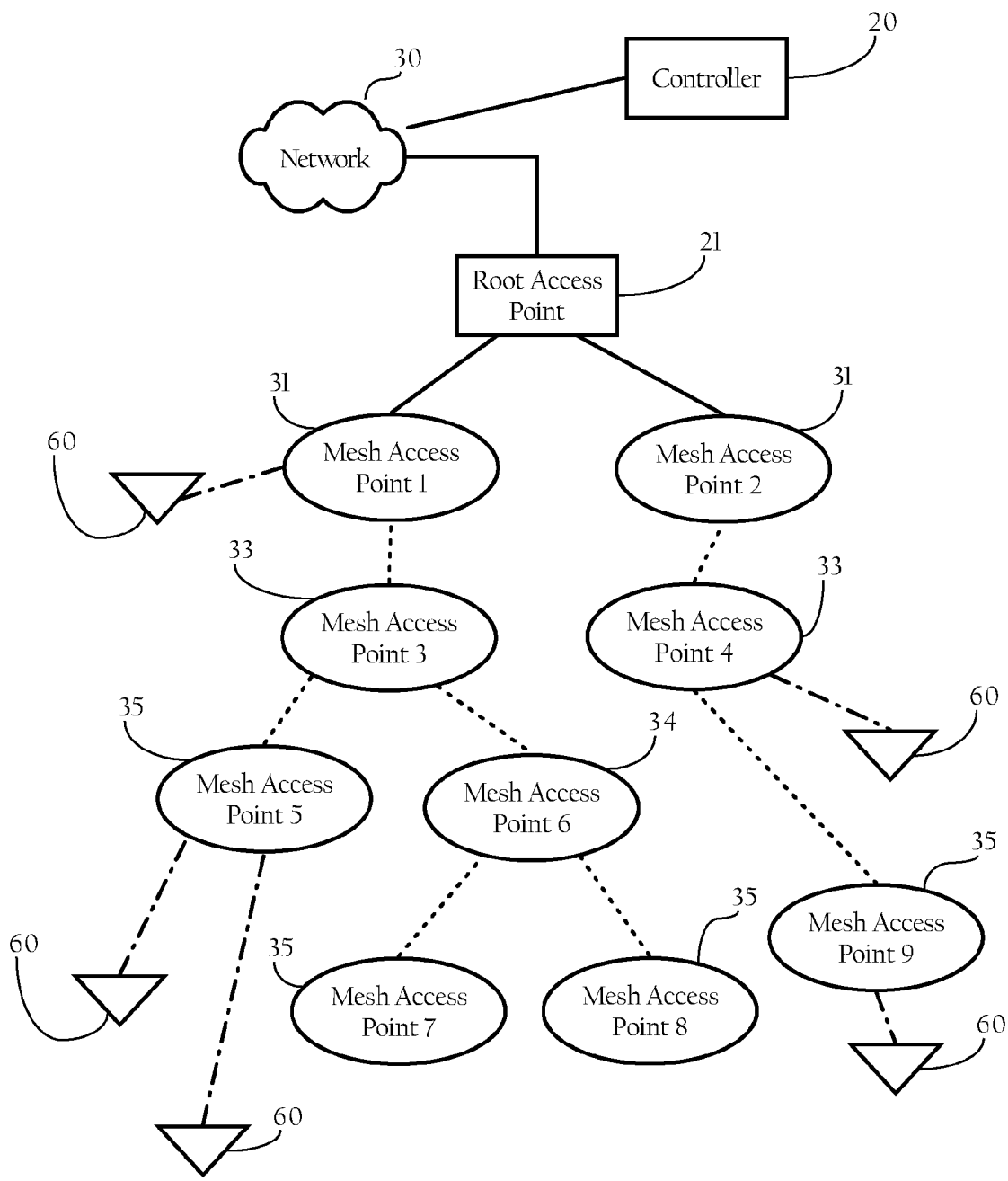
Fig._1

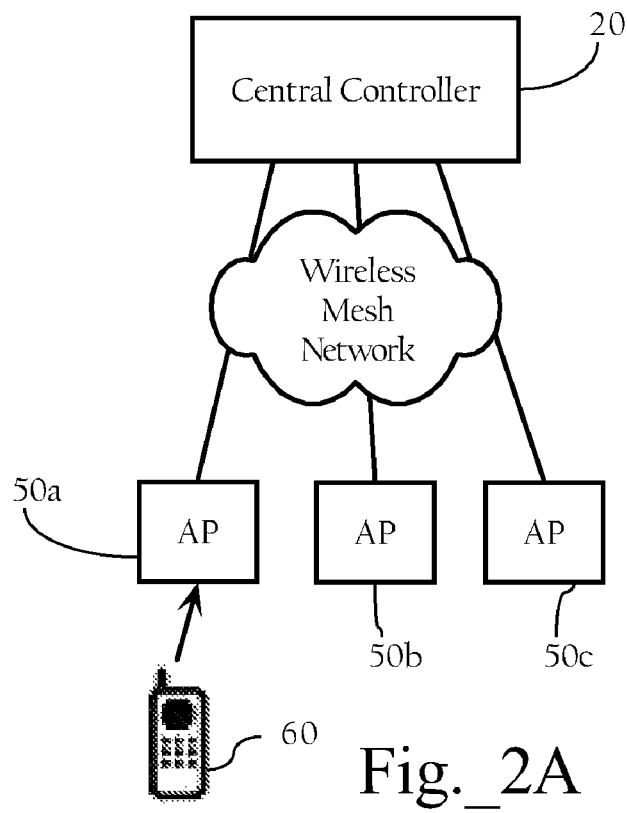
Fig._2A
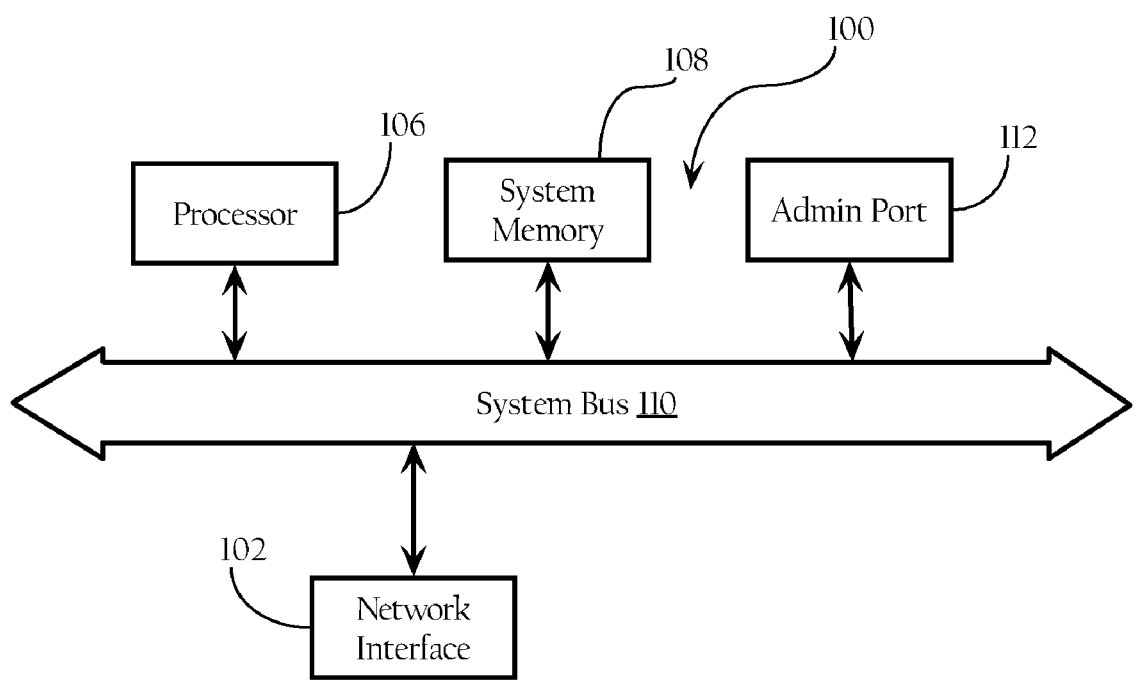
Fig._2B

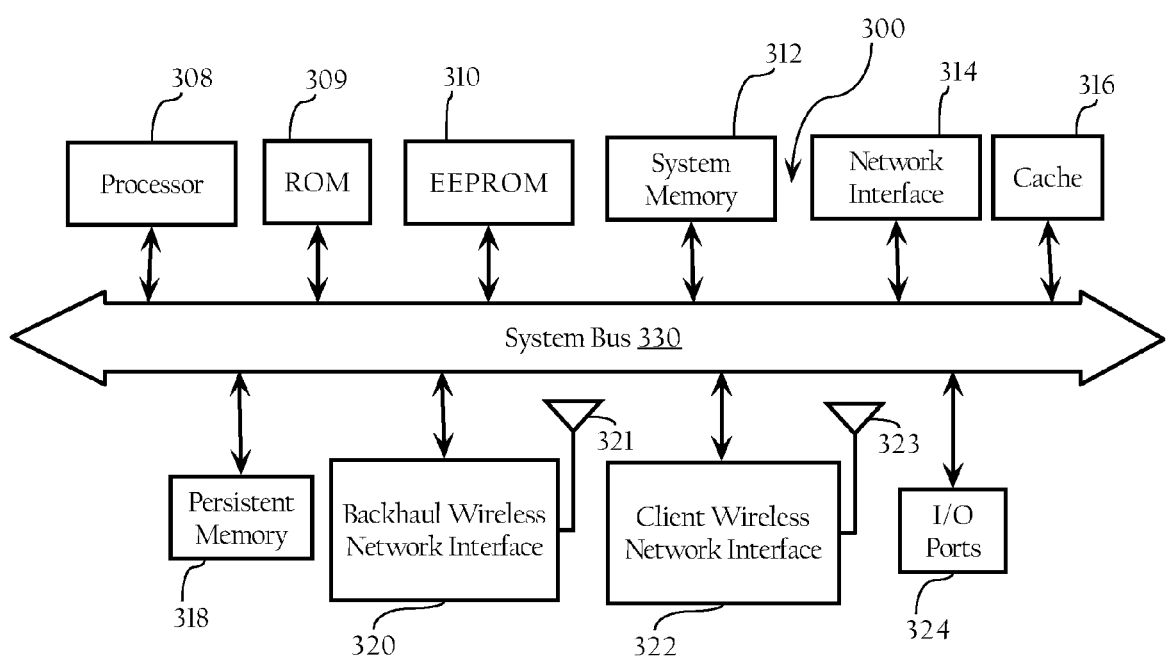
Fig._3

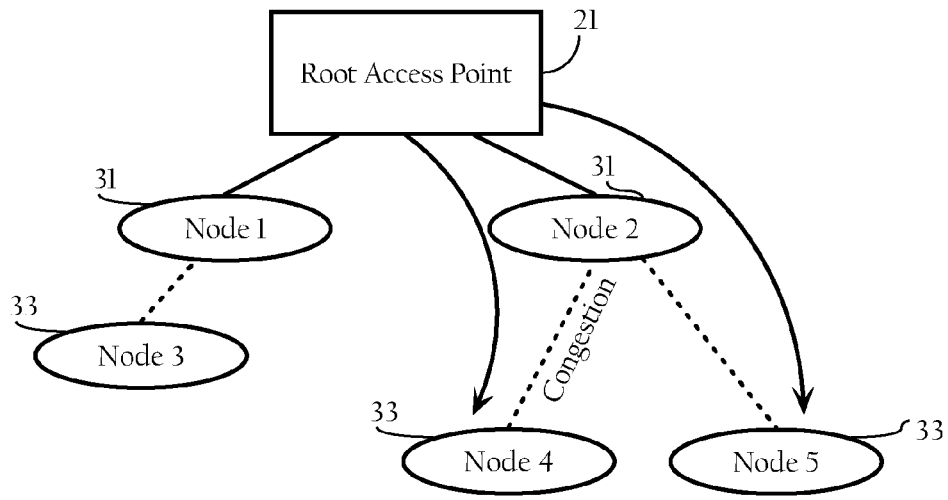

Fig._4

| ID | Length | Congestion Control Mode = 1 | Congestion Duration (AC - BK) | Congestion Duration (AC -BE) | Congestion Duration (AC -VI) | Congestion Duration (AC -VO) |
|---|---|---|---|---|---|---|
| 1 byte | 1 byte | 1 byte | 2 bytes | 2 bytes | 2 bytes | 2 bytes |

Fig._7A

| ID | Length | Congestion Control Mode = 2 | Congestion priority (AC - BK) | Congestion priority (AC -BE) | Congestion priority (AC -VI) | Congestion priority (AC -VO) |
|---|---|---|---|---|---|---|
| 1 byte | 1 byte | 1 byte | 1 bytes | 1 bytes | 1 bytes | 1 bytes |

Fig._7B

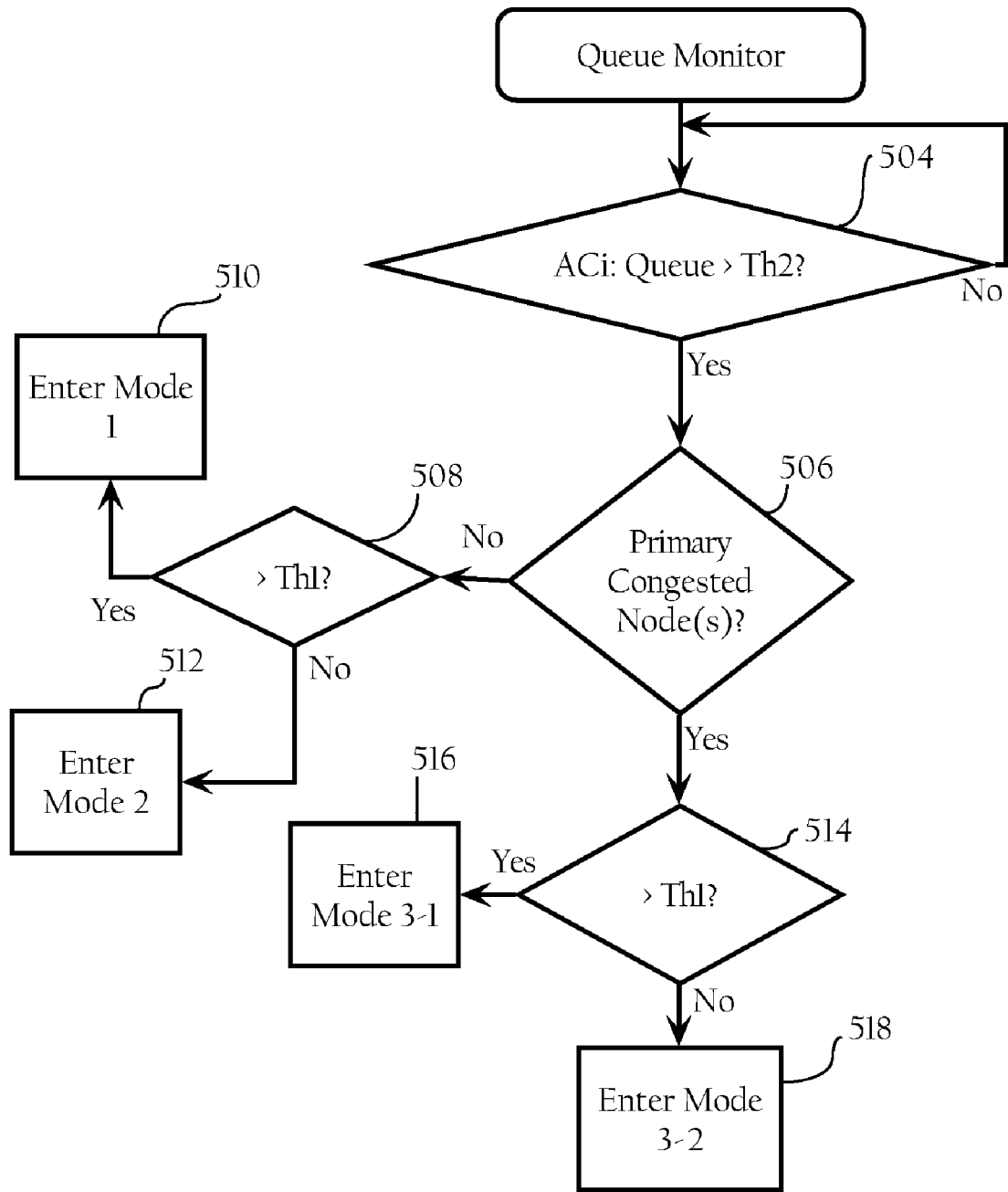
Fig._5

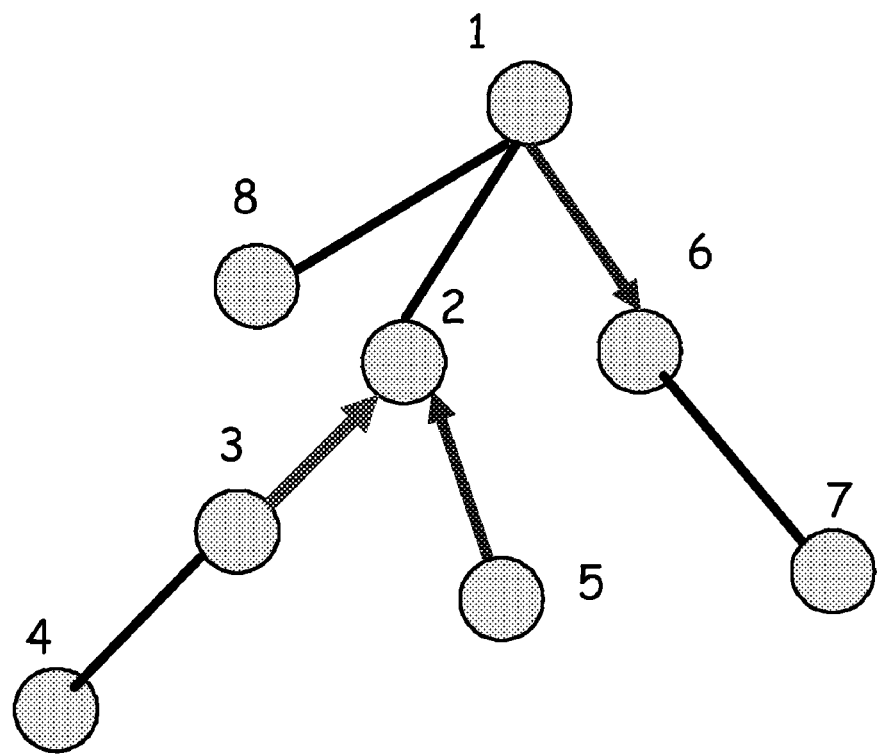
Fig._8
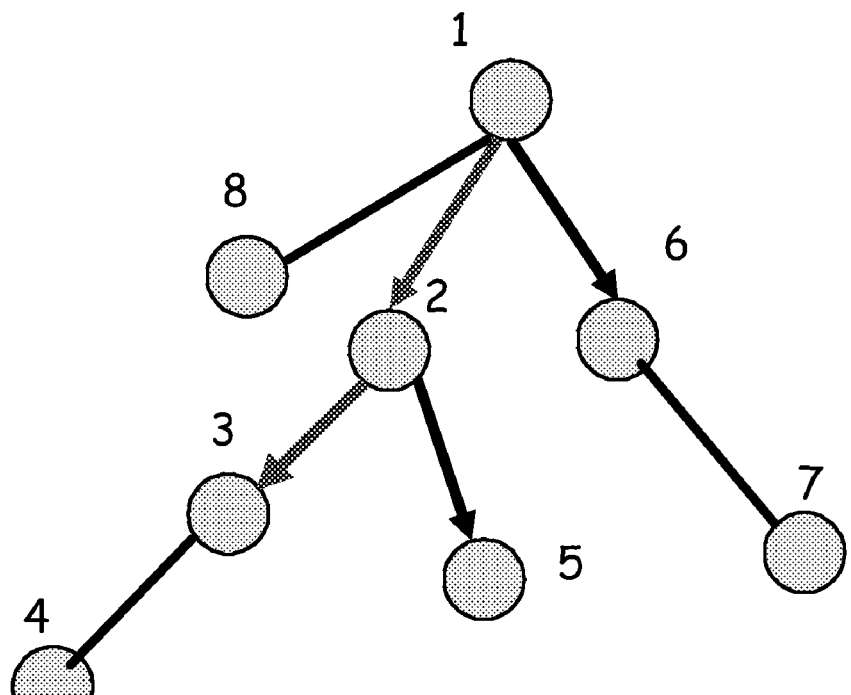
Fig._9

CONGESTION CONTROL IN WIRELESS MESH NETWORKS

TECHNICAL FIELD

The present disclosure relates generally to wireless networks and congestion control.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

In a multi-hop network, intermediate nodes that carry traffic for other nodes may observe their buffers being filled up quickly, which may result in buffer overflow and packet losses. Flow control and congestion control have always been important services available over the Internet. They prevent sending nodes from overwhelming the receiving nodes and avoid grid lock. For instance, Transmission Control Protocol (TCP) has both flow control and congestion control. However, being an end-to-end protocol, TCP has very coarse timing resolution and a long response time. Thus, TCP's congestion control does not react promptly to local congestion situations. Further, User Data Protocol (UDP) does not have any congestion control mechanism built in, so an external mechanism is required.

Providing congestion control is challenging yet important in a multi-hop wireless environment. First, the wireless medium is a shared resource, and any bandwidth consumed by one node affects the bandwidth available to its neighboring nodes. Second, in a multi-hop mesh network, traffic aggregates at intermediate nodes. If the intermediate nodes experience buffer overflow and start to drop the packets that have been delivered over multiple hops, more bandwidth is wasted. Third, TCP is very sensitive to packet losses and will throttle its congestion window in half upon detection of a single packet loss. Also, without congestion control, a multi-hop wireless network may suffer from congestion collapse, where the end-to-end throughput drops dramatically.

DESCRIPTION OF THE DRAWINGS

FIG. 1 illustrates an example topological diagram of a hierarchical wireless mesh network.

FIG. 2A illustrates a schematic, logical view of the hierarchical relationship between mesh access points and a central controller.

FIG. 2B illustrates an example hardware system, which may be used to implement a central controller.

FIG. 3 illustrates for didactic purposes a hardware system, which may be used to implement a mesh access point.

FIG. 4 is an example hierarchy of the mesh access points.

FIG. 5 illustrates an example process flow implemented at a wireless mesh access point and associated with queue monitoring.

FIGS. 7A and 7B illustrate example congestion control information fields that may be included in a congestion control message or congestion control header.

FIGS. 8 and 9 are node diagrams illustrating example operational scenarios.

DESCRIPTION OF EXAMPLE EMBODIMENTS

A. Overview

Figure 6:
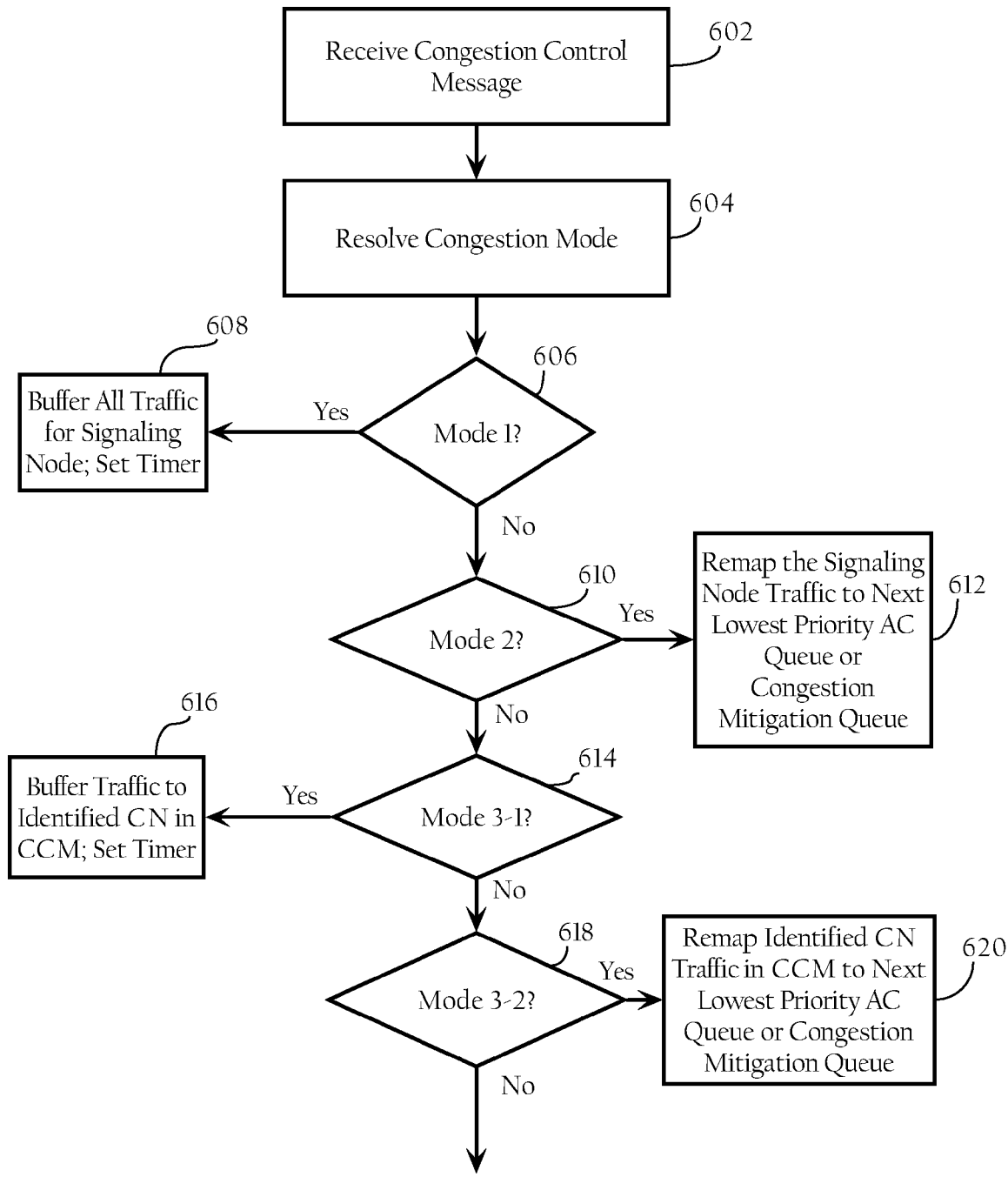
FIG. 6 illustrates an example process flow implemented at a wireless mesh access point and associated with implementing a given congestion control mode.

Particular implementations facilitate congestion control in wireless mesh networks. According to particular implementations, mesh nodes monitor their own access class (AC) queues for congestion. If a given mesh node detects congestion at one or more AC queues, the mesh node determines a congestion control mode based on the degree of congestion (e.g., a predefined number of packets in the congested AC queue or a percentage of the queue that is filled). The mesh node then sends congestion control messages to upstream nodes. In one implementation, a congestion control message requests that the receiving upstream node reduce traffic (e.g., stop or slow down traffic) or increase traffic (e.g., resume or speed up traffic). In one implementation, the congestion control message may indicate one or more sources of congestion. In some congestion control modes, the mesh node receiving the congestion control message adjusts traffic (e.g., reduces or increases traffic) for all downstream mesh nodes. For example, as described in more detail below in connection with FIG. 5, in particular implementations, if a mesh node goes into a node congestion control mode 1 (e.g., stop mode), the mesh node buffers all traffic from the upstream node(s). If the mesh node goes into a AC congested control mode 2 (e.g., slow mode), the mesh node remaps traffic from the signaling upstream mesh nodes to the next lowest priority AC queue. In some congestion control modes, the mesh node receiving the congestion control message selectively adjusts traffic for the congested downstream mesh nodes. For example, in one implementation, if the mesh node goes into a node congestion control mode 3-1 (e.g., selective-stop mode), which is similar to node congestion control mode 1 except that the mesh node buffers all traffic to an identified congested node identified in the congestion control message. If a mesh node goes into an AC congestion control mode 3-2 (e.g., selective-slow mode), which is similar to AC congestion control mode 2 except that the mesh node remaps traffic to one or more congested nodes identified in the congestion control message to the next lowest priority AC queue. The congestion control messages may be transmitted to either parent or child nodes (or to both parent and child nodes) depending on the AC transmit queues experiencing congestion and depending on the transmitter of frames in the queues.

B. Example Wireless Mesh Network System Architecture

B.1. Network Topology

FIG. 1 illustrates a wireless mesh network according to one implementation of the present invention. In one implementation, the wireless mesh network includes a wireless mesh controller 20, a root access point 21, and a plurality of child wireless mesh access points. In one implementation, the mesh access points are logically arranged in a hierarchy for purposes of routing traffic to the root access point (RAP) and on to a network. In one implementation, this hierarchy can be either dynamically configured and shifted based on the discovery of wireless management messages between wireless mesh access points, or can be statically configured.

In one implementation, a hierarchical architectural overlay is imposed on the mesh network of routing nodes to create a downstream direction towards leaf routing nodes 35, and an upstream direction toward the root access point 21. For example, in the hierarchical mesh network illustrated in FIG. 1, a first hop mesh access point 31 is the parent of intermediate mesh access point 33. In addition, intermediate mesh access points 33 and 34 are the parent to leaf mesh access point 35. In one implementation, this hierarchical relationship is used in routing packets between wireless clients 60, or between wireless clients 60 and network 30. Of course, a variety of wireless mesh network configurations are possible including non-hierarchical configurations and hierarchical configurations with a fewer or greater number of hierarchical tree structures.

The mesh access points in the mesh network, in one implementation, generally include one radio, operating in a first frequency band, and associated wireless communication functionality to communicate with other mesh access points to thereby implement the wireless backbone, as discussed more fully below. All or a subset of the mesh access points, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each mesh access point may interact with wireless clients on the 2.4 GHz band (802.11b/g). Of course, this relation can also be reversed with backhaul traffic using the 802.11b/g frequency band, and client traffic using the 802.11a band. In addition, the mesh access points may include only a single radio or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parents nodes in the routing hierarchy.

B.2. Central Controller

FIG. 2A illustrates the logical relationship between mesh access points and controller 20 relative to wireless clients, according to one possible implementation of the invention. In one implementation, the mesh access points, in connection with the controller 20, implement a hierarchical processing scheme for management of wireless connections with clients 60. For example, each mesh access point may be configured to autonomously implement time-critical link layer functions (such as transmitting acknowledgements), while also encapsulating and forwarding wireless management frames (e.g., association requests, etc.) and other client traffic to controller 20 for processing. The encapsulated frames may traverse one or more intermediate mesh access points in the mesh hierarchy as indicated by FIG. 2A.

In other implementations, the controller 20 may be implemented as a wireless domain management server (WDMS). If the controller 20 is implemented as a WDMS, the functionality implemented by the mesh access points may comprise the full range of processing functions for wireless data frames as well wireless management frames (e.g., association requests, etc.) and other client traffic. Of course, a variety of other mesh routing and control schemes can be used in connection with the real-time transport protocol described herein.

FIG. 2B illustrates an example hardware system 100, which may be used to implement a controller 20. As FIG. 2B shows, in one implementation, the central controller 20 includes a network interface 102. Controller 20, in one implementation, further comprises a processor 106, a memory 108, one or more software modules stored in memory 108, including instructions for performing the functions described herein, and a system bus 110 operably connecting these components. The central control elements may optionally include an administrative port 112 allowing for administrative access for such purposes as configuration and diagnostic access.

B.3. Wireless Mesh Access Point

FIG. 3 illustrates for didactic purposes a hardware system, which may be used to implement a wireless mesh access point in a wireless mesh network. In one implementation, the wireless mesh access point 300 comprises a processor 308, a read-only memory (ROM) 309, and an electronically erasable read-only memory (EEPROM) 310. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The backhaul wireless network interface 320 and client wireless network interface 322 may be radio interfaces. The wireless mesh access point 300 may also include input/output (I/O) ports 324 and a system bus 330 interconnecting these components.

In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, one or more of these software components are loaded into system memory 312 and then accessed and executed by processor 310. In one implementation, the wireless mesh access point 300 includes software or firmware modules for recognizing the reception of network management information and for storing such information in memory (e.g., EEPROM 310).

C. Basic Wireless Network Environment

FIG. 4 is an example hierarchy of the mesh access points. The hierarchy includes root access point 21, mesh access point 1 31 (labeled Node 1), mesh access point 2 31 (labeled Node 2), mesh access point 3 33 (labeled Node 3), mesh access point 4 33 (labeled Node 4), and mesh access point 5 33 (labeled Node 5). The following example assumes that there is downstream unidirectional traffic flowing from the root access point 21 to leaf mesh access points 4 33 and mesh access point 5 33 via mesh access point 2 31.

In operation, each mesh access point (e.g., mesh access point 4 33) has AC queues of different priorities and fills each queue with packets as they are received. If the mesh access point 4 33 cannot transmit packets fast enough, one or more queues may reach one or more predefined thresholds that indicate degrees of congestion. In one implementation, when a mesh access point such as mesh access point 4 33 experiences congestion at one or more of its AC queues, mesh access point 4 33 sends a backpressure packet or congestion control message to its parent node(s). Note that this is true for not only for leaf nodes such as mesh access point 4 33 but also for non-leaf nodes where congestion could come from parents or children or both. In one implementation, the congestion control message may contain congested node field that indicates the original source of congestion (e.g., mesh access point 4 33 itself, a child node, etc.).

In one implementation, if mesh access point 4 33 experiences congestion, it may indicate that it is experiencing congestion to parent nodes by setting a congestion field in the packet header of the congestion control message or in any a reserved field of other wireless frames. In particular implementations, the congestion field may correspond to an access class in the packet header. Note that setting a congestion bit in the header introduces little overhead, whereas explicit signaling might be used when, for example, there is no reverse traffic to be sent. Also, explicit signaling messages carry more information. The two methods are complementary to each other.

Because the parent node mesh access point 2 31 may stop or slow down its transmission to at least mesh access point 4 33, mesh access point 2 33 may itself experience congestion and in turn send a congestion control message to its parent node(s) (e.g., root access point 21). As such, upon receiving the congestion control message, root access point 21 may stop or slow down traffic to at least mesh access point 2 31.

As described in more detail below, in one implementation, to prevent a given parent node that receives a congestion control message from unnecessarily stopping or slowing down traffic destined for non-congested nodes, the parent reduces traffic to congested nodes and not to non-congested nodes. As such, non-congested nodes are not affected.

In one implementation, a congestion control message may contain multiple congested node fields to indicate multiple sources of congestion. In particular implementations, the congestion control message may be broadcast, multicast, or unicast. In one implementation, a congestion control message may be multicast to a group of mesh nodes, such as the child nodes of a given mesh access point. In implementation, a given mesh access point may respond to the congestion control messages sent from its neighbor nodes that have established secured peer links with it. In one implementation, the congestion control message contains the sender address, the receiver address, the congestion control mode, and various other fields.

C.1. Access Class Queue Monitoring

As noted above, each mesh node monitors its own AC queues and signals its parent node(s) (and more generally, all 1-hop neighbors in its tree) when congestion occurs at one or more AC queues. The following descriptions in connection with FIGS. 5 and 6 describe an AC queue monitoring process and implementation of various congestion control modes.

FIG. 5 illustrates an example process flow implemented at a wireless mesh access point and associated with queue monitoring. Referring to both FIGS. 4 and 5, a wireless mesh) access point (e.g., mesh access point 2 31) monitors the length of its own queues and, as to each AC queue, determines a congestion mode based on the state of the AC queue. In a particular implementation, the wireless mesh access point monitors the depth of the AC queues relative to two thresholds (Th1 and Th2). A first threshold (Th2) is lower than a second threshold (Th1). The first threshold (Th2) determines whether traffic should be reduced, while a second threshold (Th1) determines whether traffic should be stopped. In one implementation, the first threshold (Th2) may be specific to a given queue. In another implementation, the first threshold (Th2) may be specific to a given node. For example, in one implementation, the first threshold (Th2) may be specific to all of the queues associated with a particular node. As FIG. 5 illustrates, if the number of packets in the AC queue has exceeded a predefined congestion threshold $Th_2$ (504). In one implementation, the number of packets in a given AC queue or the percentage of the AC queue that is filled quantifies the degree of congestion. If the number packets in a given AC queue has exceeded the congestion threshold $Th_2$, mesh access point 4 33 determines if one or more child nodes are primary congested nodes (506). The mesh access point 4 33 may utilize any suitable method or algorithm to determine whether a given node is congested. For example, mesh access point 4 33 may become congested if one of its child nodes was congested. As such, mesh access point 4 33 may have received a congestion control message from its child node. As such, that child would be a primary congested node and may be identified in a congestion control message that is transmitted upstream.

If the packets in the AC queue are not destined for a primary congested node, mesh access point 4 33 determines if the number of packets in the AC queue exceeds a mode 1 threshold (Th1) (508). If so, the mesh access point 4 33 enters node congestion control mode 1 (510). In one implementation, the degree of congestion may also be a percentage of the queue that is filled in lieu of the number of packets. As described in more detail below in connection with FIG. 6, in one implementation, node congestion control mode 1 is a stop mode, which is described detail below in connection with FIG. 6.

If the AC queue does not exceed the mode 1 threshold (Th₁), mesh access point 4 33 enters AC congestion control mode 2 (512). In one implementation, AC congestion control mode 2 is a slow down mode, which is described detail below in connection with FIG. 6. In one implementation, if the AC queue is in node congestion control mode 1 but then the AC queue drops below the node congestion control mode 1 threshold, mesh access point 4 33 may switch to AC congestion control mode 2.

If the packets in the AC queue are destined for a primary congested node, mesh access point 4 33 determines if the number of packets in the AC queue exceeds a mode 3-1 threshold (Th1) (514). If so, the mesh access point 4 33 enters node congestion control mode 3-1 (516). In one implementation, node congestion control mode 3-1 is a stop mode. As noted above, node congestion control mode 3-1 is similar to node congestion control mode 1 except that the mesh node buffers all traffic to an identified congested node identified in the congestion control message. Node congestion control mode 3-1 is described in detail below in connection with FIG. 6.

If the AC queue does not exceed the mode 3-1 threshold ($Th_1$), mesh access point 4 33 enters AC congestion control mode 3-2 (518). In one implementation, AC congestion control mode 3-2 is a slow down mode. As noted above, AC congestion control mode 3-2 is similar to AC congestion control mode 2 except that the mesh node remaps traffic to one or more congested nodes identified in the congestion control message to the next lowest priority AC queue. AC congestion control mode 3-2 is described in detail below in connection with FIG. 6.

The different congestion modes described above result in transmission of congestion control messages to upstream nodes that indicate the identified congestion mode. FIGS. 7A and 7B illustrate example congestion control information fields that may be included in a congestion control message or a congestion control header appended to another wireless frame, such as a management frame. As FIGS. 7A and 7B indicate, the congestion control information may identify a congestion control mode (e.g., congestion control mode 1 or 2), and other information relevant to the congestion control mode. For example, if the congestion control mode=1 (indicating that traffic should stop), a duration value may be included in a field corresponding to one or more of the AC queues. When the congestion control mode is set to 1, for each queue, the expiration timer determines the period during which the node receiving the congestion control message should stop transmitting the indicated AC traffic to the congested node. If the congestion control mode=2 (indicating a slow down), a congestion priority value may be assigned to one or more of the AC queues. A congestion priority of 0 means no congestion as to that AC queue. Congestion priority of 1 means the corresponding AC queue is congested. Other implementations are possible, such as congestion control messages that identify only a single AC queue and a corresponding congestion control mode for that queue. In addition, additional congestion control information can be included, such as identifications of primary congested nodes (see above). In one embodiment, only 4 default EDCA queues are included in the message. Upon receiving the congestion control message, for each AC that is marked as congested, the traffic of that AC destined for the congested node is placed in the next-lowest-priority queue. If the queue with the lowest priority is congested, the receiving node should stop transmitting this lowest priority traffic to the congested node. In another implementation, 8 queues are included. Many wireless network chip sets implement at least 8 hardware queues. Only 4 queues, however, are needed for EDCA operation. Therefore, a mesh node can utilize the 4 spare queues as congestion mitigation queues. The 4 EDCA queues have relative priority over the 4 congestion mitigation queues, which gives the upstream nodes lower priority than the congested node so that the congested node can drain its queue faster than traffic arrives from upstream nodes. Service differentiation can be better maintained by utilizing the congestion mitigation queues rather than sending traffic in a lower priority EDCA queue.

Additional implementations are possible. For example, in one implementation, the congestion control information may be provided by an unused bit in the MAC header. In one implementation, the congestion control message may include congested node information that identifies one or more congested nodes. When the congestion control mode is set to 3, in addition to the fields shown in FIGS. 7A and 7B, the congestion control message may contain an optional final field, the "Congested Node" field. The congested node field indicates the original source of congestion.

C.2. Responding to Congestion Control Messages

FIG. 6 illustrates an example process flow implemented at a wireless mesh access point and associated with implementing a given congestion control mode. Referring to both FIGS. 4 and 6, the process begins when a wireless mesh access point (e.g., mesh access point 2 31) receives a congestion control message from a child node (e.g., mesh access point 4 33) (602) and resolves the congestion control mode identified in the message (604). As discussed above, a congestion control message may indicate a congestion control mode and other information that depends on the congestion control mode. In one implementation, the congestion control message may indicate a congestion priority for each AC queue. In one implementation, a congestion priority of 0 means that the AC queue is not currently congested. A congestion priority of 1 means that the AC queue is currently congested.

Mesh access point 2 31 determines if the designated congestion control mode (e.g., the congestion control mode determined by the congested node) is node congestion control mode 1 (606). If the designated congestion control mode is node congestion control mode 1, mesh access point 2 31 enters a stop mode and buffers all traffic that flows through the signaling node (608).

If the designated congestion control mode is not node congestion control mode 1, mesh access point 2 31 determines if the designated congestion control mode is AC congestion control mode 2 (610). If the designated congestion control mode is AC congestion control mode 2, mesh access point 2 31 enters a slow-down mode where mesh access point 2 31 remaps the signaling node traffic to the next lowest priority AC queue or (depending on implementation) a congestion mitigation queue (612). In one implementation, a predetermined number (e.g., 4) of default enhanced distributed channel access (EDCA) queues may be included in a congestion control message. As such, when a given mesh access point receives the congestion control message, the traffic of that AC destined for the congested node is remapped to the next lowest priority queue. In one implementation, if a queue with the lowest priority is congested, the receiving node should stop transmitting this lowest priority traffic to the congested node. As discussed above, in one implementation, some queues may be allocated for EDCA operation and some queues may be allocated for congestion mitigation, where queues allocated for EDCA operations have relative priority over queues allocated for congestion mitigation. This gives upstream nodes lower priority than the congested node so that the congested node can drain its queue faster than traffic that arrives from upstream nodes. In one implementation, a mesh access point may maintain service differentiation by utilizing the congestion mitigation queues rather than sending traffic in a lower priority EDCA queue.

Referring still to FIG. 6, if the designated congestion control mode is not AC congestion control mode 2, mesh access point 2 31 determines if the designated congestion control mode is node congestion control mode 3-1 (614). If the designated congestion control mode is node congestion control mode 3-1, mesh access point 2 31 buffers traffic to the identified congested node (e.g., mesh access point 4 33) in the congestion control message (616). However, as described herein, other traffic to the signaling node bound for other child nodes is transmitted.

If the designated congestion control mode is not node congestion control mode 3-1, mesh access point 2 31 determines if the designated congestion control mode is AC congestion control mode 3-2 (618). If the designated congestion control mode is AC congestion control mode 3-2, mesh access point 2 31 remaps the signaling node traffic being sent to the identified congested node to the next lowest AC queue or a congestion mitigation queue (620).

In particular implementations, the mesh access point 2 31 may remain in a given congestion control mode until updated or may remain in a given congestion control mode a predefined time period based on a corresponding expiration timer. In one implementation, if the queue length at the congested node decreases below a pre-determined threshold before an expiration timer expires, the congested node may send out another congestion control message with the expiration timer set to zero indicating no congestion. This informs the receiving nodes to resume normal transmission by putting the traffic intended for the congested node back into the normal EDCA queue. Other implementations are possible as well. In congestion mode 1, if the queue length at the congested node decreases below a pre-determined threshold, i.e. a Lower_Threshold, before the expiration timer expires, the node may send out another congestion control message with the expiration timer set to zero. In congestion mode 2, if the queue length at the congested node decreases below a Lower_Threshold, the node sends out a congestion control message with congestion priority set to 0. This is to tell the receiving nodes to resume normal transmission by putting the traffic intended for the congested node back into the normal EDCA queue.

Still further, if the congestion control message is broadcast to a neighborhood, all nodes receiving the message slow down or stop transmissions to the sending node or the original congested node as indicated in the message until a congestion control timer expires. If the congestion control message is unicast, the designated recipient node will slow down or stop its transmission to the message sender until a congestion control timer expires. The congestion control message can also be multicast to a group of mesh nodes, such as the children of the current mesh node. In a particular implementation, a given mesh node only reacts to the congestion control messages sent from its neighbors that have established secured peer links with it.

The following describes example operation scenarios for didactic purposes. In FIG. 8, mesh node 2 and node 6 are experiencing congestion, indicated by their increasing queue size. Once the queue length of node 2 increases beyond a threshold, node 2 either broadcasts a congestion control message to all of its neighbors or multicasts a congestion control message to its children (and, in the general case, to its parent or to a neighbor node). Upon receiving the congestion control message from node 2, node 3 and node 5 either stop their traffic or put the traffic destined to node 2 into the corresponding congestion mitigation queue. If the queue at node 3 builds up and reaches the threshold before the expiration timer expires, node 3 will send a congestion control message to its child, i.e. node 4. Note that by sending out congestion control messages one after another, the nodes at the network core, such as node 2 and node 3, can push the congestion situation out of the core. In the case when more packets are sent into the network than what the network can handle, extra packets are dropped only at the edge nodes without wasting bandwidth at the network core. Meanwhile, because node 6 is also experiencing congestion, it sends a congestion control message to node 1 so that node 1 operates in congestion mitigation mode when transmitting to node 6. If the queue length at the node originating the congestion control messages goes below a second threshold before the expiration timer expires, the node can broadcast another congestion control message with the expiration timer set to zero. This is to reset the expiration timer at the receiving nodes and allow them to resume normal transmission to this node.

Referring to FIG. 9, when the congestion control mode is set to 3, the original source of congestion (congested node) is identified in congestion control messages. As shown in FIG. 9, when node 3 experiences congestion, it indicates to node 2 either by setting the congestion bit in the packet header or by sending out a congestion control message. Because Node 2 has to slow down or stop its transmission to node 3, node 2 may experience congestion and sends a congestion control message to node 1. Upon receiving the congestion control message, node 1 will slow down or stop transmitting to node 2. However, traffic from node 1 to both node 3 and node 5 will be slowed down as a result. To prevent node 1 from slowing down transmission to node 5, node 2 can indicate the congested node in its congestion control message. Then, node 1 may only slow down the transmission to node 3 but not to node 5. This way, the traffic flow towards node 5 is not affected.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A method comprising:
   receiving packets into one or more; queues in a memory; and
   using one or more processors to:
   monitor the one or more queues for congestion;
   if a number of packets in the one or more queues exceeds a first threshold, determine a congestion control mode;
   generate a congestion control message indicating the congestion control mode; and
   transmit the congestion control message to one or more neighboring mesh nodes,
   wherein determining the congestion control mode comprises:
   for each of the one or more queues exceeding the first threshold, determining whether there are one or more primary congested nodes;
   if there are one or more primary congested nodes, entering a first congestion control mode if the number of packets exceeds a second threshold;
   if there are one or more primary congested nodes, entering a second congestion control mode if the number of packets does not exceed the second threshold;
   if there are no primary congested nodes, entering a third congestion control mode if the number of packets exceeds a third threshold; and
   if there are no primary congested nodes and if the number of packets does not exceed the third threshold, entering a fourth congestion control mode.

2. The method of claim 1 wherein the one or more neighboring mesh nodes comprise one or more of parent nodes and child nodes.

3. The method of claim 1 wherein the one or more queues are associated with a particular node.

4. Logic encoded in one or more non-transitory computer-readable media for execution and when executed operable to:
- receive packets into one or more queues;
- monitor the one or more queues for congestion;
- if a number of packets in the one or more queues exceeds a first threshold, determine a congestion control mode;
- generate a congestion control message indicating the congestion control mode; and
- transmit the congestion control message to one or more neighboring mesh nodes,
- wherein determining the congestion control mode comprises:
  - for each of the one or more queues exceeding the first threshold, determining whether there are one or more primary congested nodes;
  - if there are one or more primary congested nodes, entering a first congestion control mode if the number of packets exceeds a second threshold;
  - if there are one or more primary congested nodes, entering a second congestion control mode if the number of packets does not exceed the second threshold;
  - if there are no primary congested nodes, entering a third congestion control mode if the number of packets exceeds a third threshold; and
  - if there are no primary congested nodes and if the number of packets does not exceed the third threshold, entering a fourth congestion control mode.

5. The logic of claim 4 wherein the one or more neighboring mesh nodes comprise one or more of parent nodes and child nodes.

6. The logic of claim 4 wherein the one or more queues are associated with a particular node.

7. A method comprising:
- receiving a congestion control message on an interface; and
- using one or more processors to:
  - if the congestion control message indicates a first congestion control mode corresponding to a first threshold and a second threshold, buffer all traffic from one or more signaling nodes;
  - if the congestion control message indicates a second congestion control mode corresponding to the first threshold and the second threshold, remap traffic from the signaling node to a different queue;
  - if the congestion control message indicates a third congestion control mode corresponding to the first threshold and a third threshold, buffer traffic from a signaling node that is destined for one or more congested nodes; and
  - if the congestion control message indicates a forth congestion control mode corresponding to the first threshold and the third threshold, remap traffic to the identified one or more congested nodes.

8. The method of claim 7 wherein the different queue is a next lowest queue.

9. The method of claim 7 wherein the different queue is allocated for congestion mitigation.

10. Logic encoded in one or more non-transitory computer-readable media for execution and when executed operable to:
- receive a congestion control message;
  - if the congestion control message indicates a first congestion control mode corresponding to a first threshold and a second threshold, buffer all traffic from one or more signaling nodes;
  - if the congestion control message indicates a second congestion control mode corresponding to the first threshold and the second threshold, remap traffic from the signaling node to a different queue;
  - if the congestion control message indicates a third congestion control mode corresponding to the first threshold and a third threshold, buffer traffic from a signaling node that is destined for one or more congested nodes; and
  - if the congestion control message indicates a forth congestion control mode corresponding to the first threshold and the third threshold, remap traffic to the identified one or more congested nodes.

11. The logic of claim 10 wherein the different queue is a next lowest queue.

12. The logic of claim 10 wherein the different queue is allocated for congestion mitigation.

13. An apparatus comprising:
- one or more processors;
- one or more transmit queues;
- a memory;
- one or more wireless mesh network interfaces; and
- logic encoded in one or more non-transitory media for execution and when executed operable to cause the one or more processors to:
  - receive a congestion control message;
  - if the congestion control message indicates a first congestion control mode corresponding to a first threshold and a second threshold, buffer all traffic from one or more signaling nodes;
  - if the congestion control message indicates a second congestion control mode corresponding to the first threshold and the second threshold, remap traffic from the signaling node to a different queue;
  - if the congestion control message indicates a third congestion control mode corresponding to the first threshold and a third threshold, buffer traffic from a signaling node that is destined for one or more congested nodes; and
  - if the congestion control message indicates a forth congestion control mode corresponding to the first threshold and the third threshold, remap traffic to the identified one or more congested nodes.

14. The apparatus of claim 13 wherein the different queue is a next lowest queue.

15. The apparatus of claim 13 wherein the different queue is allocated for congestion mitigation.

* * * * *